United States Patent [19]

Koga et al.

[11] Patent Number: 4,662,942
[45] Date of Patent: May 5, 1987

[54] CEMENT ADDITIVES

[75] Inventors: Yasuharu Koga; Jiro Yasumura, both of Tokuyama; Mitsuo Nagano, Kudamatsu, all of Japan

[73] Assignee: Idemitsu Petrochemical Co., Ltd., Tokyo, Japan

[21] Appl. No.: 778,729

[22] Filed: Sep. 20, 1985

Related U.S. Application Data

[63] Continuation-in-part of Ser. No. 629,316, Jul. 10, 1984, abandoned.

[30] Foreign Application Priority Data

Aug. 1, 1983 [JP] Japan ................... 59-139480

[51] Int. Cl.$^4$ ................................................. C04B 7/35
[52] U.S. Cl. ....................................... 106/90; 106/314; 106/315; 524/5
[58] Field of Search ................. 106/314, 90, 315; 524/5, 157

[56] References Cited

U.S. PATENT DOCUMENTS

| | | | |
|---|---|---|---|
| 3,544,344 | 12/1970 | Pratt et al. | 106/315 |
| 3,563,777 | 2/1971 | Pratt et al. | 106/314 |
| 3,563,930 | 2/1971 | Stram et al. | 106/90 |
| 3,923,717 | 12/1975 | Lalk et al. | 106/314 |
| 4,036,660 | 7/1977 | Persinski et al. | 106/90 |
| 4,504,318 | 3/1985 | Matsuda et al. | 524/5 |
| 4,601,758 | 7/1986 | Nelson | 106/90 |

FOREIGN PATENT DOCUMENTS

| | | | |
|---|---|---|---|
| 3401813 | 7/1984 | Fed. Rep. of Germany | 524/5 |
| 42-22636 | 11/1942 | Japan | 106/314 |
| 46-16519 | 5/1971 | Japan | 106/90 |
| 60-11256 | 1/1985 | Japan | 524/5 |
| 2131409 | 6/1984 | United Kingdom | 106/98 |

*Primary Examiner*—William R. Dixon, Jr.
*Assistant Examiner*—Ann Knab
*Attorney, Agent, or Firm*—Frishauf, Holtz, Goodman & Woodward

[57] ABSTRACT

A cement additive comprising at least two fluidizing agents wherein one of the fluidizing agents is a saponified product of a sulfonated styrene-maleic acid copolymer and the other is one or more of a formalin condensate of naphthalenesulfonic acid and a polyoxyethylene-based compound.

The cement additive of this invention is added to a cement composition (cement paste, mortar or concrete) and especially prevents a reduction in the fluidity with a lapse of time.

9 Claims, 5 Drawing Figures

CEMENT ADDITIVES

This application is a continuation-in-part of application Ser. No. 629,316, filed July 10, 1984, abandoned.

BACKGROUND OF THE INVENTION

The present invention relates to cement additive comprising two or more kinds of fluidizing agent for use in cement composition. More particularly, it is concerned with a cement additive which increases dispersibility of cement particles in a cement composition (cement paste, mortar or concrete), improves fluidity of the cement composition, and further prevents a reduction in the fluidity with a lapse of time, thereby increasing workability of the cement composition.

Because of high cohesive ability of cement particles in cement compositions such as cement pastes, mortars, and concretes, addition of the calculated amount of water for hardening of cement fails to provide a cement composition with high workability. In order to improve the workability of the cement composition, therefore, it is necessary to add a higher amount of water than the calculated amount. This will, however, lead to a reduction in the strength. Thus, in order to obtain the same strength while keeping good workability, it is necessary to increase the proportion of cement in the cement composition. When, however, the proportion of cement is increased, the amount of heat liberated during the process of hardening increases, yielding a disadvantage in that formation of cracks is liable to occur.

The cement composition, after preparation, is often transported to the working field by means of agitator trucks, for example. The time required for this transportation varies depending on the distance of transport, the degree of traffic delay, and so forth. Thus, the cement composition varies in fluidity at the working field from batch to batch, making it difficult to obtain a predetermined degree of workability. Moreover, in pumping under pressure the cement composition, if the pumping operation is interrupted for certain reasons and, after a certain period of time, is started again, the fluidity of the cement composition in the pipe will drop, producing various problems such as the necessity of increasing the pumping pressure after the restart of the pumping operation and partial plugging of the pipe.

The most convenient means to increase the fluidity of the cement composition is, as described above, to increase the proportion of water. Increasing the proportion of water, however, causes cracking and peeling-apart of concrete after the working. For this reason, it is desirable to use cement additives which permit reducing the amount of water added, increasing the dispersibility of cement particles, and further imparts suitable fluidity to cement compositions and enables keeping the suitable fluidity.

As such additives, a formalin condensate of sodium naphthalenesulfonate has heretoforce been known. This condensate, however, does not sufficiently satisfy the above-described requirements since although it can impart fluidity to the cement composition, it fails to keep the fluidity for a long period of time.

SUMMARY OF THE INVENTION

An object of the present invention is to provide cement additives which overcome the above-described problems.

It has been found that the object is attained by using a saponified product of a sulfonated styrene-maleic acid copolymer.

The present invention relates to cement additives comprising two or more kinds of fluidizing agent wherein one of the fluidizing agents is the saponified product of a sulfonated styrene-maleic acid copolymer.

DETAILED DESCRIPTION OF THE INVENTION

Figure 2:
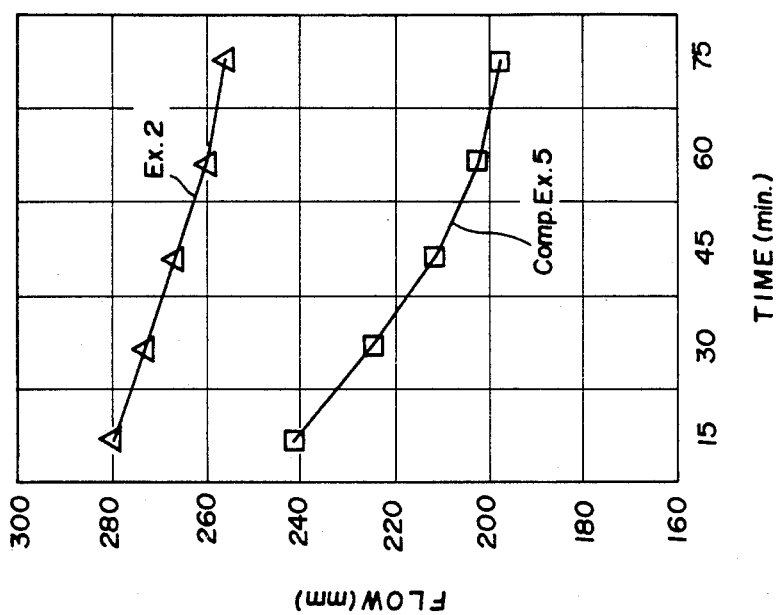
FIGS. 2 to 5 are graphs showing changes with time in the flow of a mortar composition.
Figure 1:
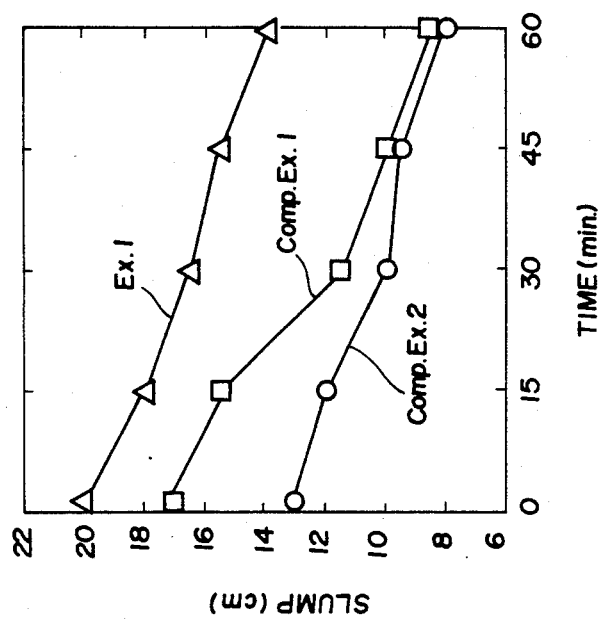
FIG. 1 is a graph showing changes with time in the slump of a concrete composition.
Figure 4:
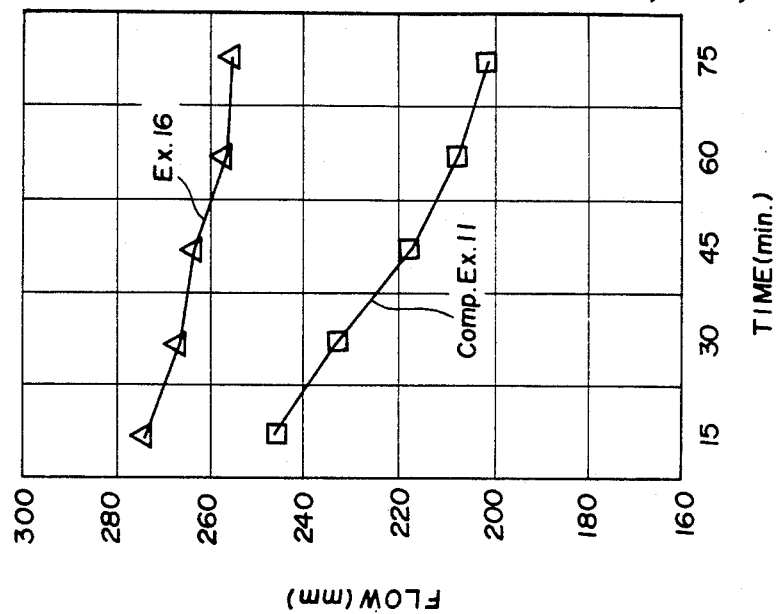
Figure 3:
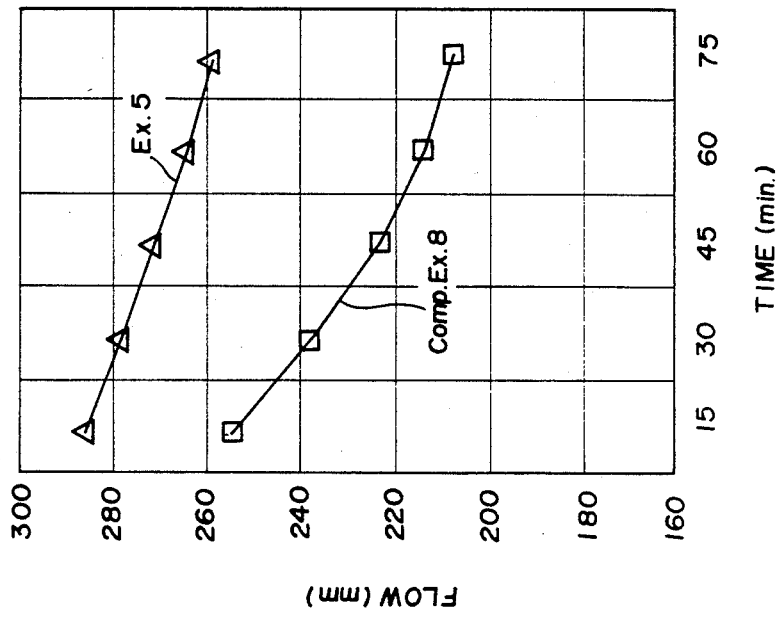
Figure 5:
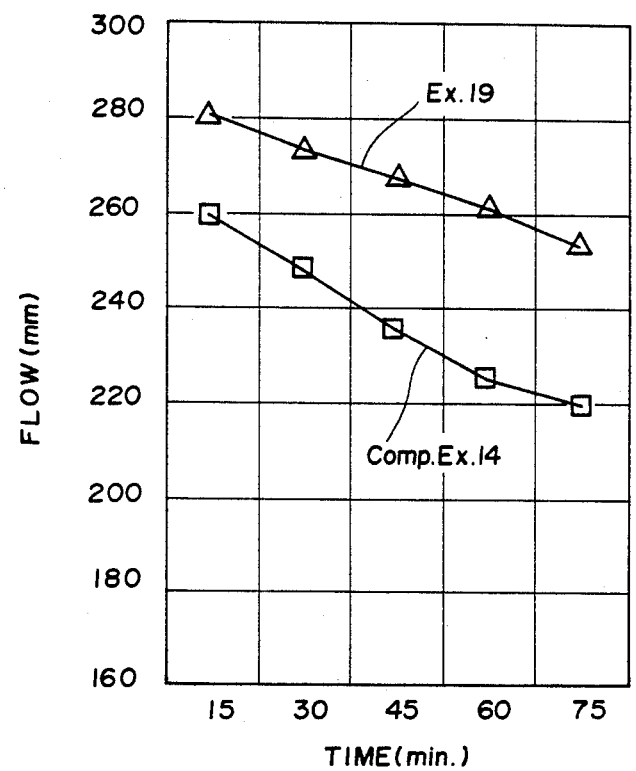

One of the fluidizing agents as used herein is a saponified product of a sulfonated styrene-maleic acid copolymer represented by the following general formula:

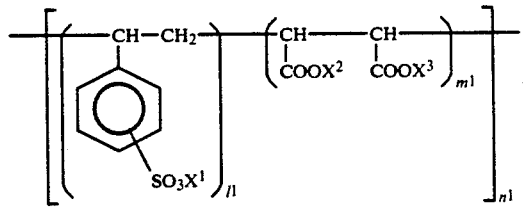

(wherein $X^1$, $X^2$ and $X^3$ are each sodium (Na), potassium (K), calcium (Ca), ammonium ($NH_4$) or an organic amino group, $l^1$ is an integer of from 1 to 5, $m^1$ is an integer of from 1 to 3, and $n^1$ is an integer of from 4 to 10).

This compound can be prepared by, for example, a procedure in which a styrene-maleic acid copolymer is sulfonated in the usual manner, unreacted copolymers are removed, and the sulfonated styrene-maleic acid copolymer is saponified by techniques such as by removing the remaining sulfuric acid as gypsum by the usual liming sodation. The styrene-maleic acid copolymer may be a random copolymer or a block copolymer, and the number average molecular weight of the copolymer is from 1,000 to 9,000 and preferably from 1,500 to 3,000.

As another fluidizing agent, one or more of a naphthalenesulfonic acid-formalin condensate and a polyoxyethylene based compound are used.

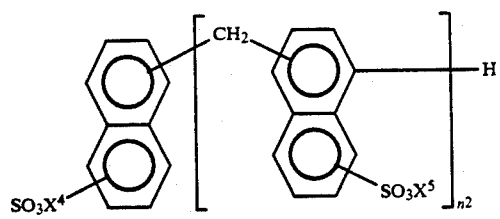

(wherein $X^4$ and $X^5$ are each sodium (Na), potassium (K), calcium (Ca), ammonium ($NH_4$) or an organic amino group, and $n^2$ is an integer of from 1 to 20). This condensate can be prepared by, for example, a procedure which involves reacting naphthalene with sulfuric acid and formalin and saponifying the product with compound such as sodium hydroxide, calcium hydroxide, potassium hydroxide etc., or alternatively treating it with a compound having ammonium group or organic amino group. In the above-described general formula, $X^4$ and $X^5$ are especially preferably sodium (Na). A mixed naphthalene containing not more than 30 percent by mole (mole %) of alkylnaphthalene can also be used.

The polyoxyethylene-based compound is sufficient to be a compound having a constituent of the formula:

(wherein $n^3$ is a real number of from 1 to 40). Representative examples are polyoxyethylene alkylphenyl ether (e.g., polyoxyethylene nonylphenyl ether), polyoxyethylene polyaralkylphenyl ether, polyoxyethylene bisphenol A ether, polyoxyethylene alkyl ether (e.g., polyoxyethylene lauryl ether), a polyoxyethylene-polyoxypropylene block copolymer (e.g., a polyoxyethylene-polyoxypropylene condensate), polyoxyethylene sec-alcohol ether, polyoxyethylene glycerine fatty acid ester, polyoxyethylene sorbitan fatty acid ester, polyoxyethylene sorbitol fatty acid ester, and polyoxyethylene alkylamine. In addition, a reaction product of polyoxyethylene alkyl ether or oxyethylene-oxypropylene block copolymer alkyl ether, sodium or ammonium or alcoholamine and sulfuric acid can be used. Of these compounds, polyoxyethylene alkylphenyl ether, polyoxyethylene alkyl ether, and polyoxyethylene-polyoxypropylene block copolymer are preferred.

Illustrative polyoxyethylenes follow:

(a) Preparation of polyoxyethylene nonylphenyl ether of the formula

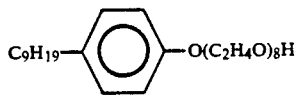

The above compound was prepared by the addition polymerization of nonylphenyl ether with ethylene oxide in the presence of alkaline catalyst. This polyoxyethylene can be utilized as the 40 percent by weight aqueous solution of polyoxyethylene nonylphenyl ether of the formula

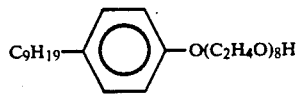

(Trade name: Emulgen 909, produced by Kao Soap Co., Ltd.)

(b) Preparation of polyoxyethylene polyaralkylphenyl ether of the formula

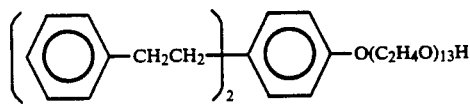

The above compound was prepared by the addition polymerization of polyaralkylphenyl ether with ethylene oxide in the presence of alkaline catalyst. This polyoxyethylene can be utilized as the 40 percent by weight aqueous solution of polyoxyethylene polyaralkylphenyl ether of the formula

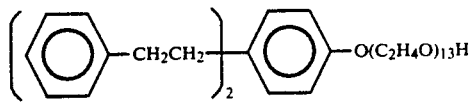

(Trade name: Emulgen A-60 produced by Kao Soap Co., Ltd.)

(c) Preparation of polyoxyethylene lauryl ether of the formula

The above compound was prepared by the addition polymerization of lauryl alcohol with ethylene oxide at a temperature of 150° C. in the presence of alkaline catalyst. This polyoxyethylene can be utilized as the 40 percent by weight aqueous solution of polyoxyethylene lauryl ether of the formula

(Trade name: Emulgen 105, produced by Kao Soap Co., Ltd.)

(d) Preparation of polyoxyethylene bisphenol A ether of the formula

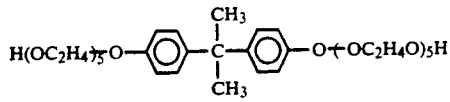

The above compound was prepared by the addition polymerization of bisphenol A with ethylene oxide in the presence of alkaline catalyst. This polyoxyethylene can be utilized as the 40 percent by weight aqueous solution of polyoxyethylene bisphenol A ether of the formula

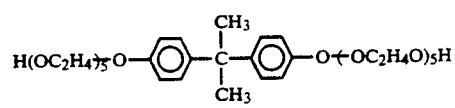

(Trade name: BA-10 produced by Nippon Emulsion Co., Ltd.)

(e) Preparation of polyoxyethylene-polyoxypropylene condensate of the formula

The above compound was prepared by the polymerization of propylene oxide to obtain polypropylene glycol and then the addition polymerization of the thus obtained product with ethylene oxide. This polyoxyethylene can be utilized as the 40 percent by weight aqueous solution of polyoxyethylene-polyoxypropylene condensate of the formula

(Trade name: Purulonic L-64, produced by Asahi Electro-Chemical Co., Ltd.)

The cement additives of the present invention can be prepared by mixing at least two fluidizing agents, one of which is sulfonated styrene-maleic acid copolymer saponified product as specified above, in the usual manner. The proportion of the sulfonated styrene-maleic acid copolymer saponified product in the cement additives varies depending on the type of the other fluidizing agent. In connection with typical fluidizing agents, the weight ratio of the sulfonated styrene-maleic acid copolymer saponified product (hereinafter sometimes referred to as "Component A") to each fluidizing agent is shown below. Naphthalenesulfonic acid salt-formalin condensate (Component $B_1$):

Component A/Component $B_3$=99.9/0.1 to 40/60

The cement additive of the present invention is added to a cement composition such as a cement paste consisting of cement and water, a mortar consisting of cement, sand and water, and a concrete consisting of cement, sand, small stone and water. In general, the amount of the cement additives added is appropriately from 0.01 to 5.0 parts by weight per 100 parts by weight of the cement (calculated as solids). If the amount of the cement additives added is too small, the effects of increasing dispersibility of cement particles in the cement composition, of reducing the amount of water, and of imparting fluidity to the cement composition cannot be expected. On the other hand, if it is too large, extreme separation of cement, i.e., so-called separation phenomenon occurs and the desired strength cannot be obtained. Moreover, when a ready-mixed concrete (not hardened) in which the separation phenomenon has occurred is pumped under pressure, plugging often occurs.

The amount of the cement additives added varies within the range as specified above depending on the type of the other fluidizing agent to be used in combination with Component A. In connection with typical fluidizing agents, the amount of the cement additives added is shown below in detail (all are calculated as solids).

Component A+Component $B_1$:

It is usually from 0.01 to 5.0 parts by weight, preferably from 0.02 to 3.0 parts by weight per 100 parts by weight of cement.

Component A+Component $B_3$:

It is usually from 0.05 to 5.0 parts by weight, preferably from 0.1 to 3.0 parts by weight per 100 parts by weight of cement.

The cement additives of the present invention may be added to the cement composition in any desired form such as solid, powder, and solution.

Although a cement composition having sufficiently satisfactory properties can be prepared by adding the cement additives of the present invention, other auxiliary constituents can be added to the cement composition, if necessary. The stage at which the cement additive of the present invention is added is not critical; that is, it can be added at any stage from the preparation of the cement composition to just before the application thereof.

The cement additive of the present invention produces various advantages. For example, (1) it increases dispersibility of cement particles in the cement composition, thereby imparting fluidity to the cement composition, (2) it permits keeping its fluidity over long period of time, and (3) it increases workability of the cement composition. Furthermore, it has the effect of reducing water and permits producing a mortar or concrete having a sufficiently high strength and free from the problems such as formation of cracks, etc. Thus the cement additive of the present invention is very useful in the engineering works, the building industry and also in the field of producing concrete secondary articles.

The present invention is described in greater detail with reference to the following Examples and Comparative Examples.

PREPARATION EXAMPLES (1) Preparation of sulfonated styrene-maleic acid copolymer saponified product (Component A)

(1-1)

A styrene-maleic acid copolymer ("SMA-3000" manufactured by ARCO Chemical Co.; number average molecular weight: 1,900, molar ratio of styrene/maleic acid: 3.0, acid value: 275) (85 grams) was dissolved in 100 milliliters of 98 percent concentrated sulfuric acid and predetermined amount of fuming sulfuric acid was added thereto over one hour while adjusting the temperature to 30° to 40° C. Then the mixture was allowed to react for 3 hours to achieve sulfonation of the copolymer.

After the reaction was completed, water was added to the reaction mixture, and the unreacted styrene-maleic acid copolymer was removed by filtration. Then the remaining sulfuric acid was removed as gypsum by performing the usual liming sodation method at 70° C., whereupon there was obtained 138 grams of the saponified product (sodium salt). The yield was 85 percent.

(1-2)

Saponified product of sulfonated styrene-maleic acid copolymer was prepared by a same procedure as in the above (1-1) except that styrene-maleic acid copolymer ("SMA-2000" manufactured by ARCO Chemical Co.; number average molecular weight: 1700, molar ratio of styrene/maleic acid: 2.0, acid value: 350) was used instead of the above styrene-maleic acid copolymer.

|  | Properties of Product | | |
|---|---|---|---|
|  | Rate of *1 Sulfonation (%) | pH*2 | Product No. |
| Product of (1-2) | 60 | 8.5 | A-1 |
|  | 75 | 9.0 | A-2 |
|  | 90 | 8.8 | A-3 |
| Product of (1-1) | 40 | 9.0 | A-4 |
|  | 70 | 8.6 | A-5 |
|  | 85 | 8.7 | A-6 |

*1 Calculated by the following equation
$$\frac{\text{amount of } SO_3 \text{ consumed for sulfonation (mole)}}{\text{amount of styrene in the styrene-maleic acid copolymer (mole)}} \times 100$$
*2 pH of 30% by weight of aqueous solution (2) Preparation of formalin condensate of naphthalenesulfonic acid salt (Component $B_1$)

A mixture of 100 grams of β-methylnaphthalene and 400 grams of naphthalene was sulfonated by treating with 600 grams of 98 percent sulfuric acid at 160° C. for 1.5 hours. Then, 310 grams of 37 percent formalin was added dropwise thereto at 100° C., and condensation reaction was performed for 5 hours. During the process of condensation, when the viscosity increased, a small amount of water was added to lower the viscosity.

The thus-prepared condensate was converted into a sodium salt form by the usual liming sodation method.

(3) Preparation of olefin-unsaturated dicarboxylate copolymer (Component $B_2$)

A mixture of 98 grams of maleic anhydride, 70 grams of isoamylene, 4 grams of azobisisobutyronitrile, and 600 grams of benzene was placed in an autoclave and reacted in a nitrogen atmosphere at 70° C. for 8 hours while stirring under pressure. After the reaction was completed, the precipitated copolymer was filtered off and dried, yielding an isoamylene-maleic acid copolymer (number average molecular weight: 2,800).

To the thus-prepared copolymer was added 1.2 equivalents of an aqueous sodium hydroxide solution, which was then heated with stirring to convert it into a sodium salt form.

(4) Preparation of polyoxyethylene nonyphenyl ether (Component $B_3$)

Component $B_3$ is described hereinbefore in paragraph (a) under the heading "Illustrative polyethylene follow."

(5) Preparation of ligninsulfonate (Component $B_4$)

A sulfite pulp waste liquor was oxidized with hydrogen peroxide under an alkaline condition, and then purified by ultrafiltration (fractional molecular weight: 1,000).

(6) Preparation of sulfonated melamine resin salt (Component $B_5$)

A mixture of 76 grams of 37 percent aqueous solution of formalin and 29 grams of melamine which had been adjusted to pH 8 with sodium carbonate was placed in a reactor made of glass and heated to 70° C. In 5 minutes, melamine was completely dissolved and the reaction mixture became transparent. Immediately the reaction mixture was cooled and 48 grams of water and 25 grams of sodium sulfite were added thereto while maintaining the temperature of the reaction mixture at 45° C. Then the mixture was heated to 80° C. and reacted at that temperature for 20 hours, yielding a sulfonated melamine resin salt.

REFERENTIAL EXAMPLES 1 TO 6

Concrete compositions as shown in Table 1 were produced by the use of a tilting mixer and then evaluated. The results are shown in Table 1.

TABLE 1

| Concrete Composition | 1 | 2 | 3 | 4 | 5 | 6 |
|---|---|---|---|---|---|---|
| Concrete (kilogram/m³) | | | | | | |
| Cement[*1] | 345 | 345 | 345 | 345 | 345 | 345 |
| Fine Aggregate[*2] (Sand) | 718 | 718 | 718 | 718 | 718 | 718 |
| Coarse Aggregate[*3] (Small Stone) | 1079 | 1079 | 1079 | 1079 | 1079 | 1079 |
| Water | 175 | 175 | 175 | 175 | 175 | 175 |
| Additive[*4] | | | | | | |
| Agent for air-entraining and water-reducing[*5] | 0.25 | 0.25 | 0.25 | 0.25 | 0.25 | 0.25 |
| Product | | | | | | |
| A-1 | 0.12 | — | — | — | — | — |
| A-2 | — | 0.12 | — | — | — | — |
| A-3 | — | — | 0.12 | — | — | — |
| A-4 | — | — | — | 0.12 | — | — |
| A-5 | — | — | — | — | 0.12 | — |
| A-6 | — | — | — | — | — | 0.12 |
| Evaluation | | | | | | |
| Air content (%)[*6] | 7.1 | 3.8 | 3.2 | 6.0 | 5.0 | 4.4 |
| Slump Value (centimeter)[*7] | | | | | | |
| Just after production | 20.0 | 20.5 | 20.5 | 18.0 | 19.0 | 21.0 |
| After 30 minutes | 19.0 | 19.0 | 19.5 | 18.0 | 18.5 | 19.5 |
| After 60 minutes | 15.5 | 18.0 | 18.0 | 16.0 | 16.5 | 19.0 |

Note
[*1]General purpose grade portland cement, a product by Tokuyama Soda Co.
[*2]Specific gravity 2.52 in saturated surface-dry condition, fineness modulus 2.34, occurring in Nagahama, Ohmishima, Japan
[*3]Crushed stone, specific gravity 2.70 in saturated surface-dry condition, fineness modulus 6.48, maximum size 20 mm, occurring in Suoh-Hanaoka
[*4]% by weight as solid based on the weight of the cement
[*5]Sodium lignin sulfonate (Pozolis No. 70, a product by Pozolis Bussan Co.)
[*6]According to JIS A 1128
[*7]According to JIS A 1101

REFERENTIAL EXAMPLE 7

Corrosion test of reinforcing bars was carried out according to JIS A 6205. In the test, 30% aqueous solution of product A-2 or non-saponified product thereof was used instead of saline. Occurrence of redish brown spot on the reinforcing bars at a boundary between gas phase and liquid phase was observed. The results are shown in Table 2.

TABLE 2

| Sample | Days tested | | | | | | |
|---|---|---|---|---|---|---|---|
| | 1 | 2 | 3 | 4 | 5 | 6 | 7 |
| Product A-2 | No | No | No | No | No | No | No |
| Non-saponified product | Yes | Yes | — | — | — | — | — |

EXAMPLES 1 TO 4 AND COMPARATIVE EXAMPLES 1 TO 6

Concrete mixtures were prepared each by blending cement, sand, gravel and water taken in specified amounts for 1 minute in a compulsory mixing machine and they by adding the additives indicated in Table 3 followed by further blending for 30 seconds. The additives A and B were added to the concrete mixture each in the form of an aqueous solution of a concentration of 20 to 40% by weight.

Characterization of these concrete mixtures was performed by the measurements of the volume of entrained air and the slump value of the uncured mixture and the compression strength of the cured concrete blocks to give the results shown in Table 3.

TABLE 3

| | Ex. 1 | Ex. 2 | Com. Ex. 1 | Com. Ex. 2 | Com. Ex. 3 | Ex. 3 | Ex. 4 | Com. Ex. 4 | Com. Ex. 5 | Com. Ex. 6 |
|---|---|---|---|---|---|---|---|---|---|---|
| Concrete Composition | | | | | | | | | | |
| Concrete (kilogram/m³) | | | | | | | | | | |
| Cement[*1] | 345 | 345 | 345 | 345 | 345 | 345 | 345 | 345 | 345 | 345 |
| Fine Aggregate[*2] (Sand) | 718 | 718 | 718 | 718 | 718 | 718 | 718 | 718 | 718 | 718 |
| Coarse Aggregate[*3] (Small Stone) | 1079 | 1079 | 1079 | 1079 | 1079 | 1079 | 1079 | 1079 | 1079 | 1079 |
| Water | 175 | 175 | 175 | 175 | 175 | 175 | 175 | 175 | 175 | 175 |
| Additive[*4] | | | | | | | | | | |
| Agent for air-entraining and water-reducing[*5] | 0.25 | 0.25 | 0.25 | 0.25 | 0.25 | 0.25 | 0.25 | 0.25 | 0.25 | 0.25 |
| A-2 | 0.05 | — | 0.05 | 0.05 | — | — | — | — | — | — |

TABLE 3-continued

|  | Ex. 1 | Ex. 2 | Com. Ex. 1 | Com. Ex. 2 | Com. Ex. 3 | Ex. 3 | Ex. 4 | Com. Ex. 4 | Com. Ex. 5 | Com. Ex. 6 |
| --- | --- | --- | --- | --- | --- | --- | --- | --- | --- | --- |
| A-3 | — | 0.05 | — | — | 0.05 | — | — | — | — | — |
| A-5 | — | — | — | — | — | 0.05 | — | 0.05 | 0.05 | — |
| A-6 | — | — | — | — | — | — | 0.05 | — | — | 0.05 |
| $B_1$ | 0.05 | — | — | — | — | 0.05 | — | — | — | — |
| $B_2$ | — | — | 0.05 | — | — | — | — | 0.05 | — | — |
| $B_3$ | — | 0.05 | — | — | — | — | 0.05 | — | — | — |
| $B_4$ | — | — | — | 0.05 | — | — | — | — | 0.05 | — |
| $B_5$ | — | — | — | — | 0.05 | — | — | — | — | 0.05 |
| Evaluation | | | | | | | | | | |
| Air content (%)*6 | 4.8 | 4.6 | 7.5 | 4.8 | 4.5 | 4.9 | 4.9 | 7.8 | 4.1 | 4.7 |
| Slump Value (centimeter)*7 | | | | | | | | | | |
| Just after production | 20.0 | 20.0 | 21.0 | 20.0 | 20.0 | 21.0 | 20.0 | 20.5 | 21.0 | 20.5 |
| After 30 minutes | 19.0 | 19.0 | 19.0 | 17.0 | 16.5 | 19.0 | 18.5 | 19.0 | 17.0 | 16.5 |
| After 60 minutes | 17.5 | 18.0 | 18.0 | 14.0 | 13.0 | 18.0 | 18.0 | 18.0 | 13.5 | 14.0 |
| Compressive Strength*8 (kilogram per square centimeter) | | | | | | | | | | |
| After 7 days | 165 | 160 | 141 | 160 | 159 | 167 | 163 | 138 | 170 | 169 |
| After 28 days | 275 | 261 | 248 | 268 | 262 | 291 | 280 | 241 | 281 | 275 |

*1-*7Same as in Table 1.
*8According to JIS A 1108.

As apparent from the Table 3, concrete compositions of Examples 1 to 4 have an excellent properties, especially changes with time in the slump value of the uncured concrete compositions are low. These results show that the durability of fluidity of said compositions is good.

On the other hand, Concrete compositions of Comparative Examples 2, 3, 5 and 6 have higher value in changes with time in the slump value. Further, concrete compositions of Comparative Examples 1 and 4 have higher value in the volume of entrained air and have lower value in the compression strength of the cured concrete blocks.

What is claimed is:

1. A cement additive comprising at least two fluidizing agents wherein one of the fluidizing agents is a saponified product of a sulfonated styrene-maleic acid copolymer, said saponified product being formed by removing sulfonic acid from said copolymer as gypsum by liming sodation, wherein the saponified product of a sulfonated styrene-maleic acid copolymer is represented by the general formula

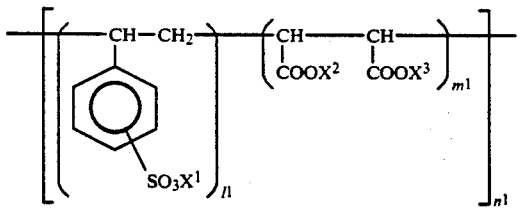

wherein $X^1$, $X^2$ and $X^3$ are each sodium, potassium, calcium ammonium or organic amino group, $l^1$ is an integer of from 1 to 5, $m^1$ is an integer of from 1 to 3, and $n^1$ is an integer of from 4 to 10, and wherein the fluidizing agent other than the saponified product is one or more of a formalin condensate of naphthalenesulfonic acid salt and a polyoxyethylene-based compound.

2. The cement additive as claimed in claim 1 wherein the fluidizing agent other than the saponified product is said formalin condensate of naphthanenesulfonic acid salt represented by the following general formula:

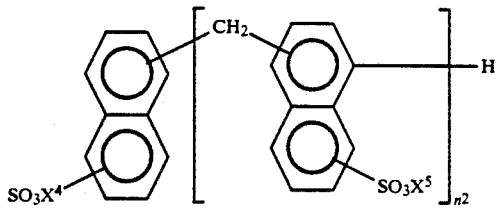

wherein $X^4$ and $X^5$ are each sodium, potassium, calcium, ammonium or an organic amino group, and $n^2$ is an integer of from 1 to 20.

3. The cement additive as claimed in claim 2 wherein the ratio of said saponified product to said condensate is from 0.5/99.5 to 99.5/0.5.

4. The cement additive as claimed in claim 1 wherein the fluidizing agent other than the saponified product is said polyoxyethylene-based compound having a constituent of the formula

wherein $n^3$ is a real number from 1 to 40.

5. The cement additive claimed in claim 4 wherein the ratio of said saponified product to said polyoxyethylene based compound is from 99.9/0.1 to 40/60.

6. A cement composition comprising 0.01 to 5.0 parts by weight of the cement additive according to claim 3 per 100 parts by weight of cement.

7. A cement composition comprising 0.05 to 5.0 parts by weight of the cement additive according to claim 5 per 100 parts by weight of cement.

8. The cement additive as claimed in claim 4 wherein said polyoxyethylene based compound is selected from the group consisting of polyoxyethylene alkylphenyl ether, polyoxyethylene polyaralkylphenyl ether, polyoxyethylene bisphenol A ether, polyoxyethylene alkyl ether and polyoxyethylene-polyoxypropylene block copolymer.

9. A cement composition comprising 0.05 to 5.0 parts by weight of the cement additive according to claim 8 per 100 parts by weight of cement.

* * * * *

UNITED STATES PATENT AND TRADEMARK OFFICE
CERTIFICATE OF CORRECTION

PATENT NO. : 4,662,942

DATED : May 5, 1987

INVENTOR(S) : KOGA et al

It is certified that error appears in the above-identified patent and that said Letters Patent is hereby corrected as shown below:

Title page, Section [30], Foreign Application Priority Data:

Change "59-139480" to --58-139480--.

Signed and Sealed this

Thirteenth Day of October, 1992

Attest:

DOUGLAS B. COMER

*Attesting Officer*   Acting Commissioner of Patents and Trademarks